United States Patent [19]
Shapiro

[11] Patent Number: 5,870,453
[45] Date of Patent: Feb. 9, 1999

[54] AUTOMATIC CONTROL SYSTEM FOR A REMOTELY CONTROLLABLE SOUND PRODUCING DEVICE

[76] Inventor: L. Dennis Shapiro, 24 Essex Rd., Chestnut Hill, Mass. 02167

[21] Appl. No.: 882,685

[22] Filed: Jun. 25, 1997

Related U.S. Application Data

[63] Continuation of Ser. No. 451,294, May 26, 1995, abandoned, which is a continuation-in-part of Ser. No. 97,850, Jul. 27, 1993, Pat. No. 5,420,907.

[51] Int. Cl.⁶ .................................................. H04M 11/04
[52] U.S. Cl. ....................................... 379/38; 379/102.03
[58] Field of Search ......................... 379/102.01–102.07, 379/106.01, 90.01, 38–40, 45, 47, 49, 51, 110.01; 348/734; 381/55–57, 104, 107, 108, 110, 72

[56] References Cited

U.S. PATENT DOCUMENTS

| | | | |
|---|---|---|---|
| 3,446,976 | 5/1969 | Shaw | 250/217 |
| 3,532,823 | 10/1970 | Ellis . | |
| 3,806,663 | 4/1974 | Peek et al. . | |
| 3,939,311 | 2/1976 | Smith . | |
| 3,940,701 | 2/1976 | Novitski | 325/392 |
| 4,023,139 | 5/1977 | Samburg | 379/49 |
| 4,243,973 | 1/1981 | Sandidge | 379/102 |
| 4,425,477 | 1/1984 | Magil | 379/110 |
| 4,438,527 | 3/1984 | Hammond | 381/107 |
| 4,760,593 | 7/1988 | Shapiro et al. | 379/38 |
| 4,819,263 | 4/1989 | Franklin | 379/390 |
| 4,858,033 | 8/1989 | Chippendale | 360/14.2 |
| 4,873,712 | 10/1989 | Porco | 379/58 |
| 4,959,851 | 9/1990 | Tobolski et al. | 379/59 |
| 4,996,703 | 2/1991 | Gray | 379/40 |
| 5,016,003 | 5/1991 | Rice, Jr. et al. | 379/52 |
| 5,028,919 | 7/1991 | Hidaka | 348/734 |
| 5,128,987 | 7/1992 | McDonough et al. | 379/102 |
| 5,164,729 | 11/1992 | Decker et al. | 342/20 |
| 5,210,784 | 5/1993 | Wang et al. | 379/38 |
| 5,233,646 | 8/1993 | Kuromi | 379/102 |
| 5,237,602 | 8/1993 | Lazik | 379/38 |
| 5,251,253 | 10/1993 | Chutuk | 379/102 |
| 5,265,154 | 11/1993 | Schotz | 379/102 |
| 5,420,907 | 5/1995 | Shapiro | 379/38 |

FOREIGN PATENT DOCUMENTS 55-135407  10/1980  Japan .................................... 379/102

*Primary Examiner*—Wing F. Chan
*Attorney, Agent, or Firm*—Weingarten, Schurgin, Gagnebin & Hayes LLP

[57] ABSTRACT

Electronic circuitry is provided that is operative to detect telephone usage or doorbell activation, whereupon the circuitry causes a command signal, such as a muting signal recognizable by an audio or sound producing device, to be emitted and deactivate or mute the device. With respect to muting in response to a phone call, a manual operator input or detection of a telephone on-hook condition causes the device to be restored. Following doorbell activation induced muting, timing features of the circuitry cause a restoration signal to be sent to the device automatically after a predetermined period of time has elapsed. The muting circuitry is particularly suited as an enhancement to a personal emergency response system, as well as for a remotely monitored alarm system that incorporates a listening device. In a personal emergency response system, muting circuitry associated with a home communicator unit can be activated manually or automatically from an emergency response center, or upon activation of the home communicator by a service subscriber in response to a distress signal from the home communicator. The muting circuitry can function as a stand-alone system or be tied into an automated building data bus.

9 Claims, 4 Drawing Sheets

AUTOMATIC CONTROL SYSTEM FOR A REMOTELY CONTROLLABLE SOUND PRODUCING DEVICE

RELATED APPLICATION

This application is a continuation of application Ser. No. 08/451,294, filed May 26, 1995 abandoned which is a continuation-in-part of application Ser. No. 08/097,850, filed Jul. 27, 1993, entitled: AUTOMATIC CONTROL SYSTEM FOR A REMOTELY CONTROLLABLE SOUND PRODUCING DEVICE, now U.S. Pat. No. 5,420,907

FIELD OF THE INVENTION

This invention relates to personal emergency response systems and to muting circuitry useful therewith.

BACKGROUND OF THE INVENTION

Personal emergency response systems are known in which a subscriber can signal an emergency condition by depressing a control button to cause automatic dialing and signaling of a response center which will act to summon help to the subscriber. Such systems often have a speaker-phone at the subscriber station so that communication with the subscriber can be attempted or carried out after an emergency call has been made and the call established. The use of such speaker-phone communication during an emergency call can be seriously impaired if a television, radio or other audio device is operating in the same room as the speaker-phone or in the same facility at a volume sufficient to interfere with the conversation attempted via the speaker-phone. The problem is exacerbated if the subscriber is an aged or other individual having impaired hearing ability.

It would, therefore, be desirable to provide speaker-phone operation in a personal emergency response system, as well as in other similar contexts, where the presence of operating television sets, radios and the like would not interfere with telephone use.

SUMMARY OF THE INVENTION

In brief, the invention provides a system for automatically providing a command signal to a television, radio, or other audio-producing device in response to a telephone call or other designated event. The command signal is associated with any of a number of operator selectable functions. One such function is device muting or deactivation so that otherwise audible sounds from the television or other device will not interfere with a telephone conversation or other intended activity. Another function is channel changing to a predetermined station or frequency, such as a communications link or an emergency information network, for example.

The invention has particular application in a personal emergency response system. For this aspect of the invention, a muting signal can be provided directly in response to actuation of a control button used by a subscriber to automatically dial and signal an emergency response center or to initiate a predetermined calling sequence. In another aspect of the invention, circuitry is provided that is operative to detect an incoming telephone call or an off-hook condition. Upon such detection, a muting signal is transmitted to a television set, a radio, an audio system, or other audio-producing device. The muting circuitry can be integral to, or in communication with, a home communicator unit so that the muting circuitry can be activated manually or automatically from an emergency response center in response to a distress signal sent from a home communicator.

The invention is not limited to operation within a personal emergency response system, but can also be employed to mute a television set or other audio device in response to an incoming call on an ordinary telephone, thereby providing an environment conducive to telephonic communication without the distraction or interference of sounds of audio equipment present in the vicinity of the telephone.

According to another aspect of the invention, a muting signal can be provided in response to an event or condition other than an incoming telephone call. For example, the invention can be operative in response to the ringing of a doorbell, either by detection of the ringing sound or signal or by detection of the switch closure of the doorbell button. The muting signal is provided in response to such detection to cause muting of one or more associated audio devices.

According to yet another aspect of the invention, a muting signal can be provided by remote activation of a listening device associated with an alarm system. The ensuing muting of one or more audio-producing devices at the alarmed location allows an operator at a remote monitoring station to "listen in" on activity at the alarmed location that might be otherwise undetectable due to noise produced by the audio producing device.

The circuitry also provides for restoration of a muted audio producing device to its pre-muted audio producing state. With respect to muting in response to a phone call, a manual operator input or detection of a telephone "on-hook" condition causes the device to be restored. Following doorbell activation induced muting, timing features of the circuitry cause a restoration signal to be sent to the device automatically after a predetermined period of time has elapsed. Similarly, in association with an alarm system, deactivation of the listening device is an event which is detected and employed to restore the audio device to its activation state.

In a preferred embodiment, the muting signal is provided in a form recognizable by a television set or other audio-producing device having built-in muting capability and transmitted via a wireless link such as via infrared communication. If an audio device without built-in muting capability is to be controlled, the invention contemplates the provision of a controller which is connectable to the device to cause muting of the audio, or the provision of a shut-off signal to completely deactivate the device in response to the muting signal. Upon receipt of another signal from the muting system, the controller restores the device.

BRIEF DESCRIPTION OF THE DRAWINGS

These and further features of the invention may be better understood with reference to the accompanying specification and the drawings in which.

DETAILED DESCRIPTION OF THE INVENTION

Figure 1:
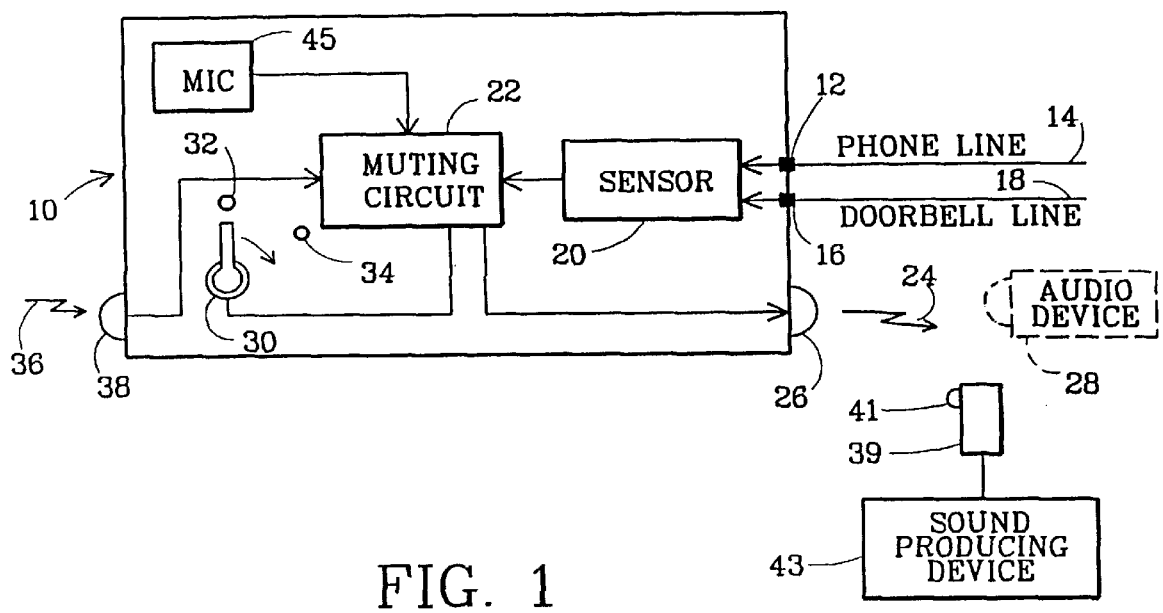
FIG. 1 is a schematic illustration of an automatic muting system in accordance with the invention.

FIG. 1 is a schematic illustration of an automatic muting system 10, having at least one input line connector 12 connecting a signal transmission line 14, such as a telephone line, to the automatic muting system 10. The word "transmission line" comprises wired lines or paths such as electrical wire paths and optical fiber paths, as well as wireless paths such as radio, microwave, laser, electronic and the like. Also depicted is an optional second input line connector 16 connecting a second signal transmission line 18, such as a doorbell line, to the automatic muting system 10. The automatic muting system 10 includes a sensing circuit or sensor 20 in communication with the input line connectors 12, 16 that detects a predetermined signal input from the signal transmission lines 14, 18 and produces a sensor output.

Figure 2:
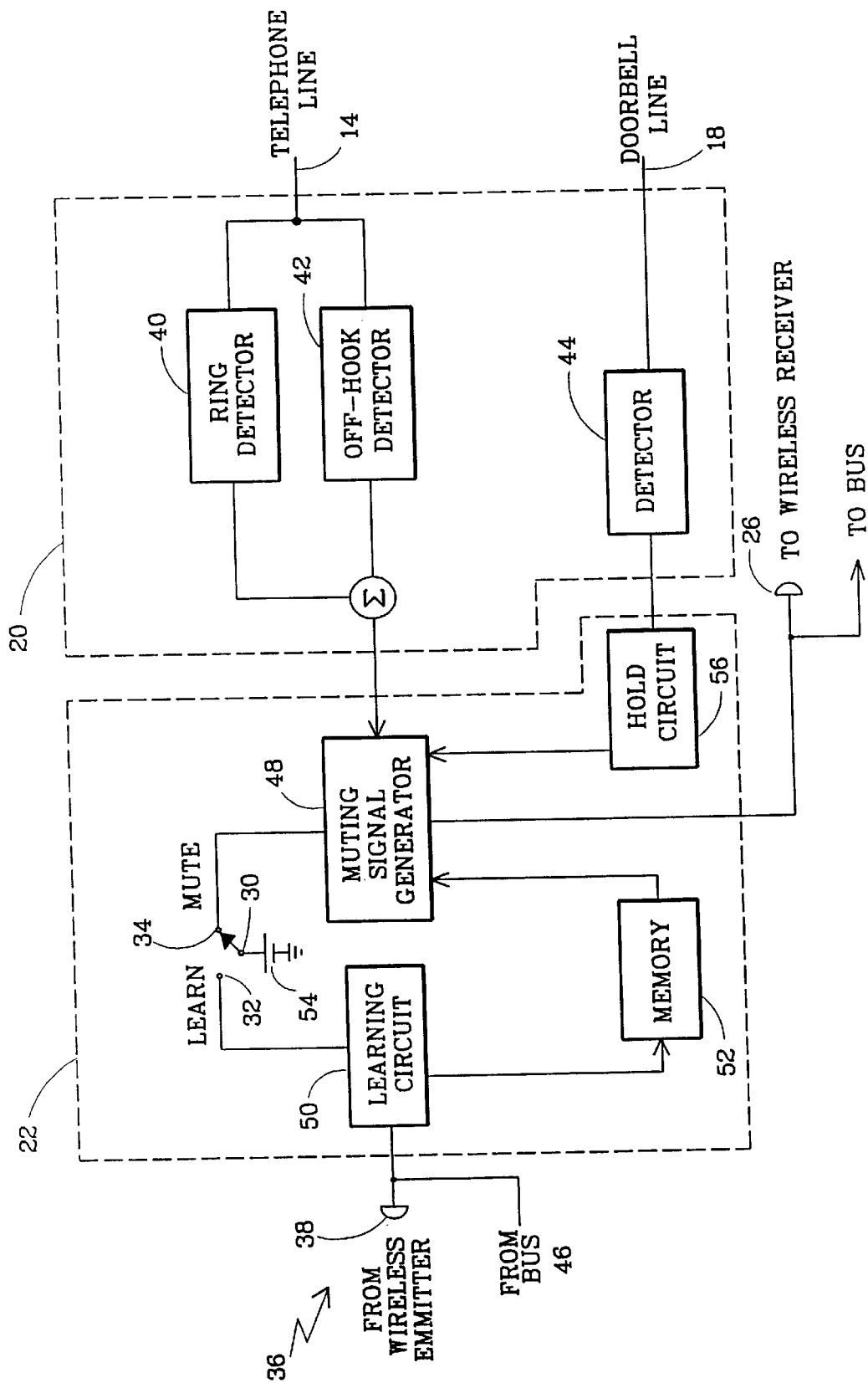
FIG. 2 is a block diagram of the automatic muting system of FIG. 1.

The automatic muting system 10 further includes a command signal circuit, such as a muting circuit 22, discussed in greater detail with respect to FIG. 2, that processes the sensor output to generate a command signal, such as a muting signal 24. The command signal circuit is responsive to an operator's selection of a desired function, and although the description hereinbelow is directed toward embodiments of the invention for muting, the invention is equally suitable for turning equipment on and off, as well as for selecting a predetermined station or communications link, for example.

With respect the command circuit that includes a muting circuit, a wireless emitter 26, such as an infrared or radio frequency device is provided to transmit the muting signal 24 to a remotely controllable, sound or audio-producing device 28, such as a television, stereo, or any other audio-producing apparatus that is responsive to an emitted signal or that is remotely controllable. It is to be understood that the muting circuit 22 also is able to restore or "un-mute" a device 28 muted thereby by generating a restoration signal. When the circuit is used to automatically select a predetermined frequency, the restoration signal can cause a selected device 28 to return to the previous channel or frequency.

However, not all remotely controllable, audio-producing devices 12 are responsive to a common muting signal. Therefore, the muting circuit 22 of the remote muting system 10 is provided with optional circuitry for "learning" the code required for a specific audio-producing device 28 to be controlled. Accordingly, a switch 30 is provided that is movable, as indicated by the arrow, between a learn position 32 and a normal operating, or muting, position 34. When the automatic muting system 10 incorporates learning circuitry, the learning circuitry is responsive to an emitted signal 36 from, for example, the audio device's normal remote control unit, that is captured by a suitable receiver 38.

The invention is also useful with audio devices that do not have mute buttons or which do not have remote control muting features. Therefore, an additional feature of the invention is a muting controller 39, shown in FIG. 1. The muting controller 39 is provided with a wireless receiver 41 to intercept the muting signal 24 emitted from the automatic muting system 10 and is responsive thereto for muting, turning off, or otherwise controlling a sound producing device 43. Alternatively, the muting controller 39 can be responsive to the automatic muting system 10 through the normal electrical wiring of a building to which both are coupled.

In one embodiment, the sound producing device 43 is plugged into the muting controller 39 which is plugged into a wall socket. When the muting controller receives a muting signal, it shuts off power to the device 43 to silence it until a restoration signal is received, or for a predetermined period of time, after which the device 43 is restored.

Because some control signals to mute and restore, or turn on and off are identical, under some circumstances the initial detection of an event by the sensor 20 could turn on or restore a presently muted device 28, thus confounding the intended benefit of the invention. Accordingly, the automatic muting system 10 can be provided with a microphone 45 that listens to the ambient conditions for sounds associated with an audio device 28. The ringing sound of the phone or buzz of the doorbell, for example, if associated with an event signal, is filtered out using techniques known to those skilled in the art. The microphone 45 can be placed in communication with the muting circuit 22 via appropriate logic so that detection of audio device sounds causes the microphone 45 to provide an enabling signal to the muting circuit 22. If no sound is detected, the muting circuit 22 is not enabled.

FIG. 2 is a more detailed block diagram of one embodiment of the sensor 20 and muting circuit 22 of the automatic muting system 10. The sensor 20 is provided with one or more detectors to detect a predetermined event identified with a signal input from the signal transmission lines 14, 18. In an exemplary embodiment, a ring detector 40 senses an incoming telephone call. An "off-hook" detector 42 is provided for physically or electronically sensing lifting of a handset, or activation of a telephone to respond to or to initiate a call, depending on the type of communication instrument used. A doorbell activation detector 44 is also provided.

Figure 3:
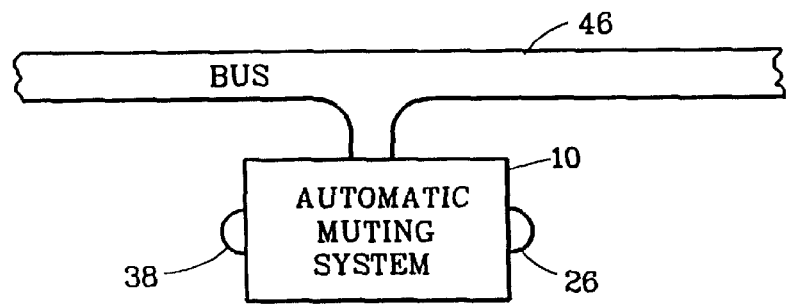
FIG. 3 is a schematic illustration of the automatic muting system of FIG. 1 tied into a signal bus.

The automatic muting system 10 can be provided with additional input line connectors and detectors as desired to accommodate other signal inputs, such as alarms for example, or connected to a data bus 46 such as in an automated building facility as illustrated in FIG. 3. The bus 46 can comprise unidirectional and bi-directional analog and digital signal transmission paths for communication devices, alarms, appliances, and the like. When connected to a bus 46, the muting signal 24 can be transmitted via the wireless emitter 26 as described with respect to FIG. 1, or directly onto the bus 46.

Referring again to FIG. 2, the muting circuit 22 is shown having a muting signal generator 48 that provides the muting (and restoration) signal 24, a learning circuit 50, and a memory unit 52. When the switch 30 is moved to the learn position 32, a power source 54, such as a battery, energizes the learning circuit 50. The emitted signal 36 is received by the wireless receiver 38 or the bus 46 and is analyzed to determine the code needed to make the audio device 28 responsive to the muting signal 24. Having been analyzed, the code is stored in the memory unit 52 for further processing by the muting signal generator 48.

When the switch 30 is moved to the mute position 34, the muting signal generator 48 and sensor 20 are energized, the muting signal 24 based upon the code is established, and the muting signal generator 48 enters a waiting state. Upon receipt of a predetermined event signal from the sensor 20, the muting signal generator 48 outputs the muting signal 24 to the emitter 26 or bus 46. When the predetermined event signal is absent or another event trigger signal is present, the muting signal generator 48 generates a restoration signal for transmission to the audio device 28. A hold circuit 56 or timer can be provided to establish a preprogrammed muting interval, such as 15 seconds, in association with the doorbell detector 44, for example. Manual restoration by the operator is also possible.

Figure 4:
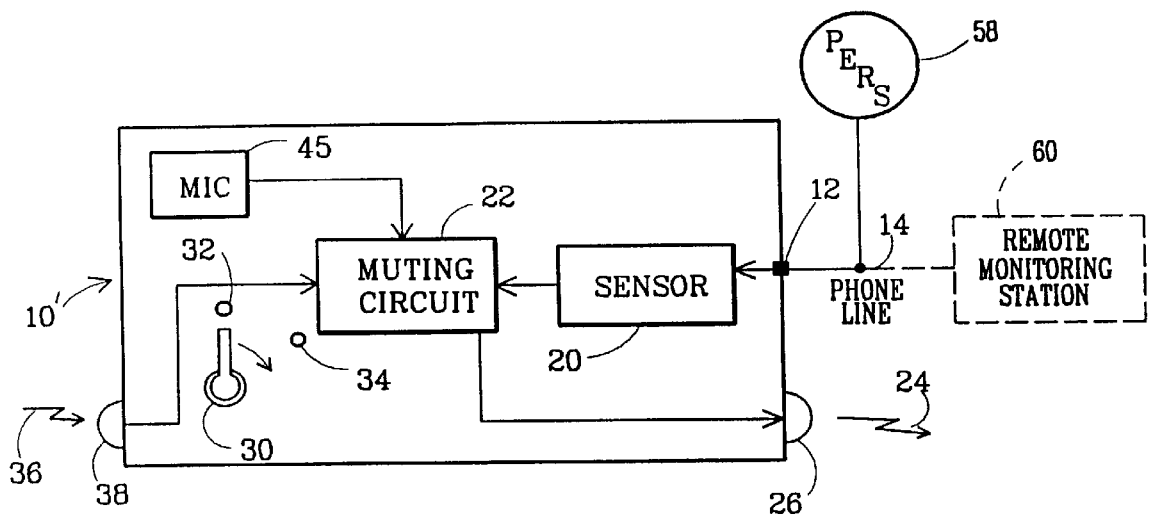
FIG. 4 is a schematic illustration of an embodiment of the automatic muting system of FIG. 1, configured for a personal emergency response system.

FIG. 4 is a schematic illustration of an automatic muting system 10' that enhances the utility of a personal emergency response system (PERS) 58. Muting of audio-producing devices is especially important for the typical user of a personal emergency response system for several reasons. Not infrequently, such users are hearing impaired, and thus are unable to distinguish the ringing of a telephone or doorbell over or through the din of one or more audio devices. Additionally, some personal emergency response systems include a speaker-phone through which a rescuer at a remote monitoring station 60, for example, can interactively communicate with the subscriber. For this feature to be effective, relatively quiet ambient conditions must prevail to enable the rescuer to hear weak or garbled utterances of a subscriber in distress. Accordingly, when an activation mechanism for the personal emergency response system 58 is triggered to engage the telephone line 14, the sensor 20 detects this in the manner described with respect to FIGS. 1 and 2, and a muting signal 24 is sent to the audio device 28. When the personal emergency response system 58 disengages from the signal transmission line 14, a restoration signal is emitted to return the audio to its previous level.

In addition to incorporation in personal emergency response system applications, other communications applications, such as remotely monitored alarm systems benefit from the advantages of remote muting provided by the circuitry of the invention. A "listen-in alarm" system, for example, uses listening devices such as microphones to continuously listen to sounds at the subscriber's premises, such as those sounds associated with breaking and entering, like loud blows or breaking glass. Appropriate filters and logic determine when an "alarm" condition is achieved and the remote monitoring station is signaled to obtain an appropriate response.

Figure 5:
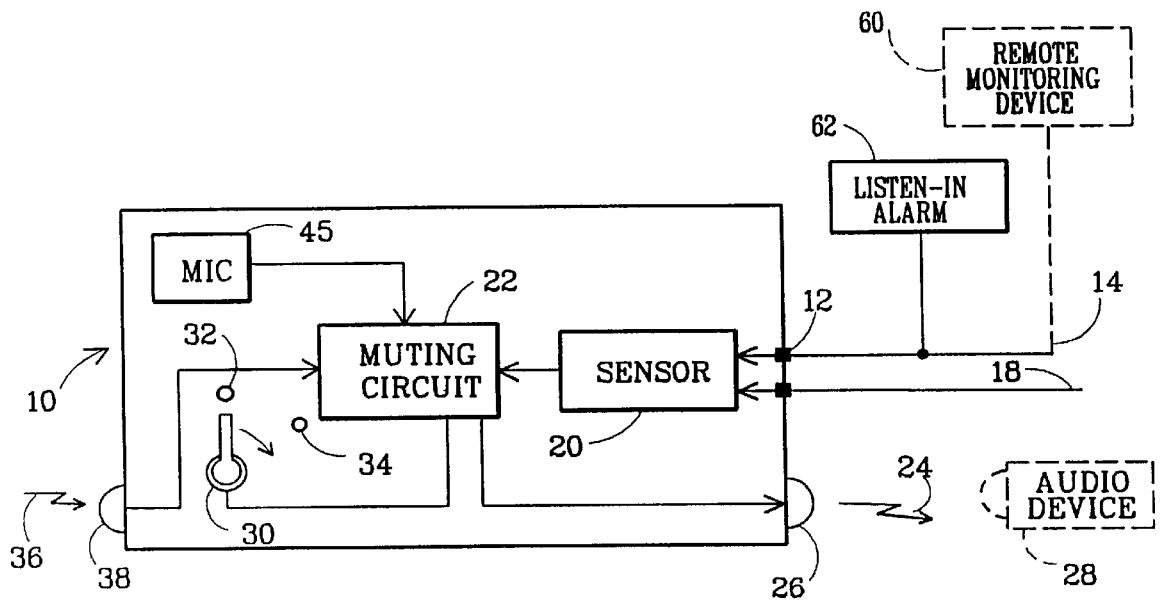
FIG. 5 is a schematic illustration of the automatic muting system of FIG. 1, configured for a listening device associated with a remote monitoring system.

Referring to FIG. 5, an automatic muting system 10 is illustrated in communication with a remote monitoring station 60 and a listen-in alarm 62. In this application, the activation of the alarm 62, by the triggering of the alarm at the protected site or by actuation by the monitoring station and a concomitant call to the remote monitoring station 60 are events detectable by the sensor 20 in the automatic muting system 10 which then initiates the muting sequence as described hereinabove for muting one or more audio-producing devices 28. The muting signal can be provided in response to any one or more detectable events in a particular embodiment. It is to be understood that an audio-producing device 28 can include anything that produces audible sounds to include machinery, a fan, a blower, and the like. After a predetermined time interval or discontinuance of the "alarm" condition, a restoration signal is emitted to restore the muted devices 28 to their previous state.

Figure 6:
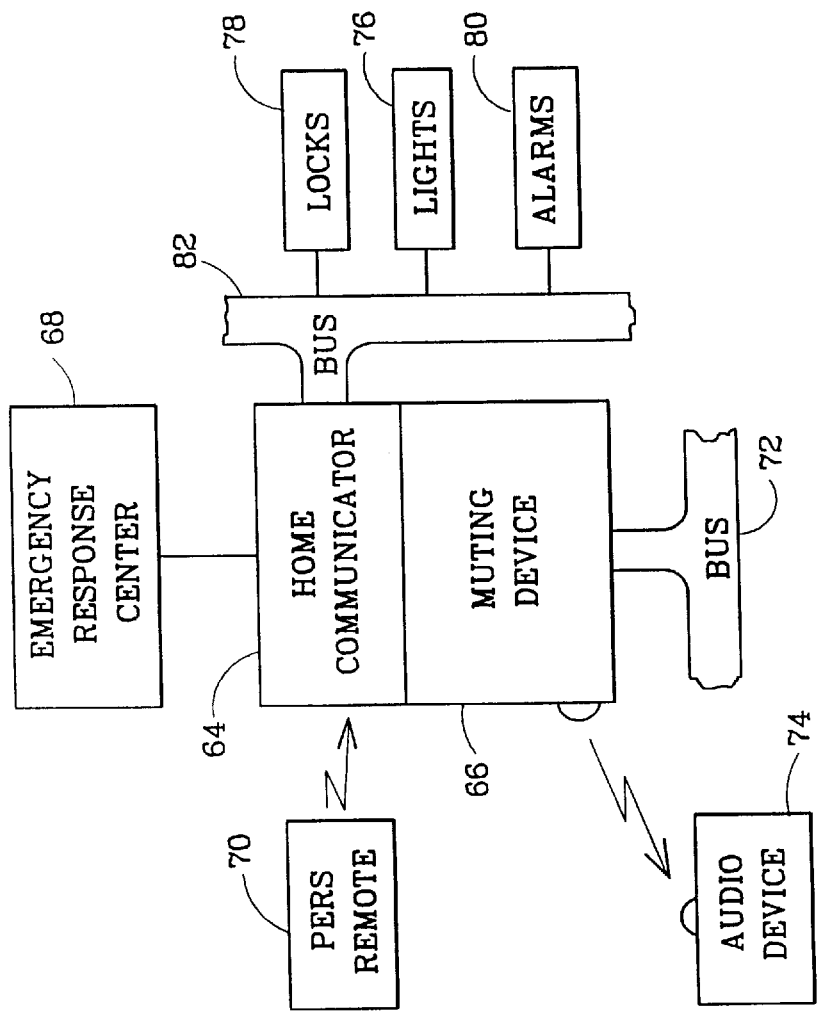
FIG. 6 is a block diagram of yet another embodiment of the automatic muting system.

FIG. 6 is a block diagram of a personal emergency response system (PERS) that includes a home communicator 64, a muting device 66, and an emergency response center 68. The home communicator 64 is capable of sending a distress signal to the emergency response center 68. Upon receipt of the distress signal, the emergency response center 68 automatically sends one or more command signals to the home communicator 64 to cause one or more preselected events to be initiated with one or more respective control signals provided by the home communicator. Alternatively, an operator at the emergency response center 68 can manually select and sequence sending of command signals to the home communicator 64.

One or more command signals can also be sent to the home communicator 64 from a PERS remote device 70, such as those typically carried by a PERS service subscriber, which is also used to cause the home communicator 64 to send a distress signal to the emergency response center 68.

One of the events that can be initiated by a control signal from the home communicator 64, in response to a command signal from the emergency response center 68 or the PERS remote 70, is activation of the muting device 66. The muting device 66 can be tied into a bus 72 and/or be provided with one or more infrared and/or radio-frequency transmitters to send a muting signal to one or more audio producing devices 74 as described hereinabove. The muting device 66 can also be manually activated by an operator at the emergency response center 68 if noise from a television, radio, or the like is heard by the operator over the telephone or a voice system integral to the home communicator 64 or the PERS remote 70.

Other events that can be responsive to control signals include activation or deactivation of other electrically controllable devices such as lights 76, electronic locks 78, alarms 80 and the like at the subscriber's location either with infrared or RF transmitters as described above or via a bus 82. Information regarding particular devices to be activated or deactivated can be included with other subscriber information accessible to the operator at the emergency response center 68 and automatically accessed and processed by a control system and the emergency response center.

Although the invention has been shown and described with respect to exemplary embodiments thereof, various other changes omissions and additions in form and detail thereof may be made therein without departing from the spirit and scope of the invention.

What is claimed is:

1. A personal emergency response system for use in an environment having an electrically controllable sound producing remote device, said personal emergency response system comprising:

a home communicator capable of sending a distress signal for establishing a first communications link;

an emergency response center for receiving said distress signal from said home communicator;

a remote actuator capable of transmitting an activation signal over a second communications link directly to said home communicator to cause transmission of the distress signal; and a muting device responsive to the sending of said distress signal from said home communicator, for sending a muting signal over a third communications link to said electrically controllable sound producing remote device to cause an adjustment in sound from said electrically controllable sound producing remote device.

2. A personal emergency response system for use in an environment having an electrically controllable wireless remote sound producing device, said personal emergency response system comprising:

a home communicator capable of sending a distress signal for establishing a first communications link, receiving a command signal, and sending a control signal in response to said command signal;

an emergency response center for receiving said distress signal from said home communicator and communicating over said first communications link with said home communicator, said emergency response center capable of sending said command signal to said home communicator over said first communications link in response to said distress signal; and a muting device in communication with said home communicator, wherein said home communicator is operative in response to said command signal from said emergency response center to send said control signal to said muting device over a second communications link, said muting device sending a muting signal to said electrically controllable wireless remote sound producing device over a third communications link in response to said command signal to cause a response from said electrically controllable wireless remote sound producing device.

3. The personal emergency response system of claim 2, wherein said muting device includes an infrared transmitter for sending said muting signal.

4. The personal emergency response system of claim 2, further including a signal bus linking said muting device to said home communicator.

5. The personal emergency response system of claim 2, wherein said muting device includes a radio-frequency transmitter for sending said muting signal.

6. The personal emergency response system of claim 2 further comprising:

a remote actuator capable of transmitting an activation signal directly to said home communicator to cause transmission of the distress signal.

7. A personal emergency response system for use in an environment having an electrically controllable wireless remote device, said personal emergency response system comprising:

a home communicator capable of receiving a command signal over a first communications link and sending a first control signal over a second communications link in response to said command signal;

a remote actuator capable of transmitting an activation signal to said home communicator over a third communications link; and a controller device responsive to said first control signal from said home communicator for sending a second control signal over a fourth communications link to said electrically controllable wireless remote device to cause a response from said electrically controllable wireless remote device, after said home communicator receives said command signal.

8. Apparatus for use in a personal emergency response system having a home communicator operative to dial and communicate over a first communications link with an emergency response center, said apparatus for controlling an electrically controllable remote device in the vicinity of the home communicator, said apparatus comprising:

a first circuit at the emergency response center operative in response to detection of an incoming call to provide a first signal indicative of call detection;

a second circuit capable of sending a control signal in response to the first signal, said control signal having a form recognizable by said electronically controllable remote device; and a transmitter in communication with said second circuit and operative to convey said control signal to said electrically controllable remote device to cause a response from said remote device, wherein detection of an output from said electrically controllable remote device above a predetermined threshold causes said second circuit to be enabled.

9. A personal emergency response system for use in an environment having an electrically controllable sound producing remote device and an electrically controllable lock, said personal emergency response system comprising:

a home communicator capable of sending a distress signal over a first communications link, receiving a command signal and sending a control signal over a second communications link in response to said command signal;

an emergency response center for receiving said distress signal from said home communicator, said emergency response center capable of sending said command signal to said home communicator;

a remote actuator capable of transmitting an activation signal directly to said home communicator over a third communications link; and a device responsive to said home communicator for sending a muting signal over a fourth communications link to said electrically controllable sound producing remote device to cause an adjustment in sound from said electrically controllable sound producing remote device and for sending a deactivation signal to said electrically controllable lock to cause deactivation of said lock, after said home communicator receives said command signal.

* * * * *